United States Patent [19]

Styles et al.

[11] 3,990,790

[45] Nov. 9, 1976

[54] SLIDE PROJECTORS

[75] Inventors: Robert Edward Styles; John Cosmer Les Veaux, both of Sydney, Australia

[73] Assignee: Hanimex Pty. Limited, Australia

[22] Filed: Jan. 30, 1975

[21] Appl. No.: 545,614

[30] Foreign Application Priority Data

Feb. 8, 1974 Australia............................. 6515/74

[52] U.S. Cl................................ 353/109; 353/101; 40/32
[51] Int. Cl.² ....................................... G03B 23/08
[58] Field of Search ................ 353/109, 101; 40/32, 40/96, 97, 98, 35

[56] References Cited
UNITED STATES PATENTS 3,729,254   4/1973   Frey et al............................. 353/109

*Primary Examiner*—Richard E. Aegerter
*Assistant Examiner*—Larry Jones
*Attorney, Agent, or Firm*—Fulwider, Patton, Rieber, Lee & Utecht

[57] ABSTRACT

The projector for slides comprising a lens system having clips to hold slides; magazine tensioning means; a magazine indexing and slide positioning assembly comprising pivotally movable slide positioning means having an operative position where a slide is held transverse to the projection axis of the lens system and an inoperative position permitting the indexing of the magazine and including shutter means movable in timed relationship with the magazine to prevent projection during the indexing of the magazine; and a lens unit focusing system including relatively movable platforms which are selectively manually and/or power operable and linearly slideable lens unit support means operatively connected to the said platforms.

10 Claims, 7 Drawing Figures

SLIDE PROJECTORS

This invention relates to improvements in slide projectors of the type which utilise an endless flexible belt type slide holder. Such projectors are known but development of such projectors into reliable and economically feasible units has been hampered by several shortcomings in such known projectors.

The main problem with known projectors of the above type has been the complexity and unreliability of the feed mechanism to advance the slides one at a time into projection position. Due to the complexity of previously known feed mechanisms the cost of their manufacture has been considerable. The feed mechanism of the present invention is simple, reliable and economic to manufacture on a quantity basis.

Another aspect of known belt magazine projectors which has been a problem is the maintenance of a constant tension on the magazine irrespective of its length, which depends on the number of slides held by the magazine. This invention provides means to maintain a constant tension of the magazine irrespective of its length.

Another aspect of the present invention is the provision of means to manually or power adjust the focusing lens unit of the projector. The power adjustment can be made irrespective of the position of the lens unit and safety features are incorporated which prevent locking and possible damage to the adjustment means when the limits of adjustment have been reached.

The present invention in general terms comprises a projector for slides held in clips on an endless belt type magazine, said projector comprising a lens system mounted in a casing, a magazine indexing and slide positioning assembly mounted in the casing and a magazine tensioning means; said indexing and positioning assembly comprising a housing fixed within the casing, a square cross-section drive shaft rotatably mounted in the housing, means to index the drive shaft through 90° arcs to locate slides on a magazine one after the other in a slide projection position across the axis of the lens system of the projector, first arm means pivotally mounted in the housing so as to be movable between a position holding the slides immediately preceding and following the slide in projection position out of alignment with the lens system and a position releasing the immediately preceding and following slide, a second arm means interconnected with the first arm means by linkage and pivotally mounted in the housing so as to be movable between a position to end engage and so pivotally locate the slide in projection and a position releasing the slide in projection position, shutter means pivotally mounted in the housing and movable between two positions where the shutter respectively prevents and permits projection, cam means rotatably mounted in the housing to move said first and said second arm means and also said shutter means and drive means to rotate said cam means and said drive shaft indexing means in timed relative relationship.

A preferred embodiment of the invention and its several improved mechanisms is hereinafter described with reference to the drawings in which.

Figure 1:
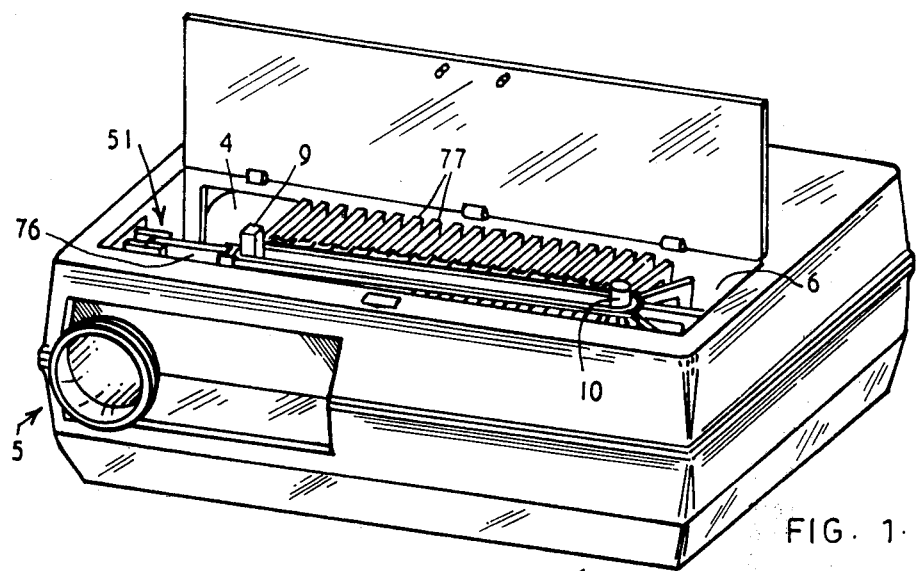
FIG. 1 is front perspective view of the projector with the lid open to show a mounted slide magazine.
Figure 2:
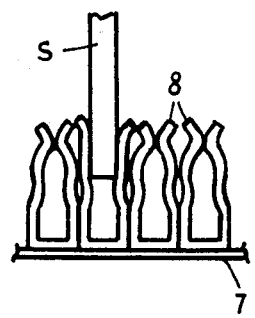
FIG. 2 is an edge fragmentary view of a portion of a magazine as used in the projector.

The projector broadly comprises a casing 1 having an internally mounted lens system incorporating a globe 2 and reflector 3 and stationary lenses 4 and a focusing lens unit 5. In a recess 6 in the casing 1 there is located means to advance an endless belt type slide magazine of known type, see FIG. 2 where a segment of such a magazine is shown comprising a flexible belt 7 with clips 8 fixed to it, a slide S is mounted in one clip. The advancing means brings one slide at a time into projection alignment with the lens system and shutter means is provided to prevent the light from globe 2 from reaching the lens unit 5 during the changing of slides.

The belt 7 of the slide magazine has a plurality of slide holding clips 8 fixed to it. The belt is stretched around a driving mast 9 of square cross-section and a tensioning mast 10 of round cross-section in known manner.

Figure 6:
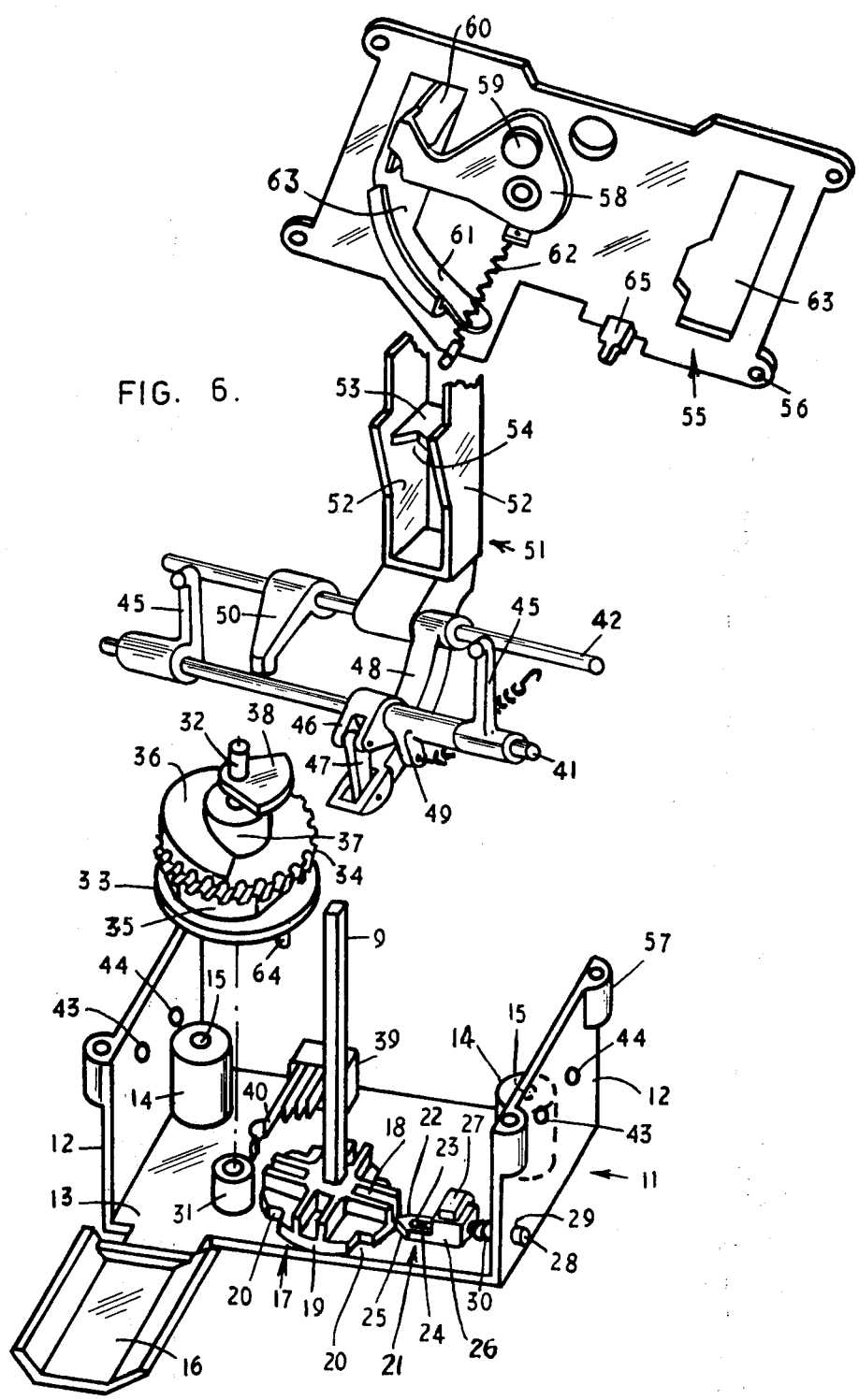
FIG. 6 is an exploded perspective view of the components of the magazine feeding and slide positioning mechanism.

The improved mechanism for advancing the slides one at a time will now be described. This mechanism is shown in exploded form, in detail, in FIG. 6. The mechanism is mountable as a unit in the casing 1 and comprises a generally U shaped sub-frame 11 having two upstanding sides 12 and a bottom 13. Two bosses 14 on the bottom 13 have holes 15 therethrough whereby screws can be inserted into the casing to hold the sub-frame 11 in place. Extending from the base 13 is a motor cradle 16.

Rotatably mounted on the base 13 is a drive shaft assembly comprising the square cross-section mast 9 to which is fixed an indexing wheel 17 of Geneva action type. The wheel has four slotted legs 18 disposed over a circular portion 19 having four indents 20, central to the legs 18, engageable by a spring loaded plunger 21. The plunger 21 has a tongue 22 with a slot 23 which slidingly engages a peg 24 on the base 13. The tongue 22 has a pointed end 25 shaped to engage in the indents 20. A body part 26 of the plunger 21 is slidably supported by lug 27 on the base 13. A plunger pin 28 on the body part 26 slides in a hole 29 in one side 12 and a spring 30 surrounding pin 28 urges the end 25 against the periphery of portion 19.

A boss 31 on the base 13 acts as a bearing for one end of a shaft 32 to which is fixed an assembly of gears and cams comprising a circular member 33, which when in place overlaps portion of the legs 18 of the indexing wheel 17. Disposed above the member 33 is a worn wheel gear 34 and between these members is a cam 35. The upper surface 36 of the gear 34 is also a cam surface surrounding a hub 37 and fixed to the shaft 32 above the gear 34 is another cam 38.

Also fixed to the base 13 is a switch assembly 39 having an operating arm which is a leaf spring 40 which rides on cam 35.

A pair of parallel shafts 41 and 42 are rotatably supported in holes 43 and 44 respectively in the sides 12. The shaft 41 has two slide positioning and movement restraining arms 45 fixed thereto. Also fixed to shaft 41 is an arm 46 pivotally connected to a link 47 in turn pivotally connected to one end of another arm 48. The arm 48 is fixed to shaft 42. A spring arm 49 is also fixed to shaft 41.

The shaft 42 has the arm 48 fixed to it along with cam follower arm 50 which rides on cam face 36. A slide centering arm 51 is also fixed to shaft 42, and comprises a pair of upstanding limbs 52, bridged by a portion 53 having a V notch 54.

A cover 55 completes the assembly. The cover 55 has lugs with holes 56 therein whereby the cover can be connected by screws to holes in bosses 57 on the sides 12. On the underface of the cover 55 there is pivotally mounted a shutter arm 58 having an upstanding boss 59 which is engaged by the cam 38. The movement of the arm 58 by cam 38 causes a shutter 60 to move back and forth in an arcuate path in a slot 61 in the cover 55 and in so doing the light from globe 2 is permitted or prevented alternately from falling on lens unit 5. The shutter 60 is spring biassed to the light occluding position by a spring 62. The slots 63 in cover 55 permit the arms 45 to project beyond the assembly to operate, as hereinafter described, on the slides. A lug 65 on cover 55 serves as an anchor for a spring which engages arm 49, the spring through the links 47-48 urges cam follower arm 50 into engagement with cam face 36.

A reversible electric motor (not shown) is mounted in cradle 16 and a worm gear fixed to the motor shaft provides the motive power for gear 34.

The belt magazine 7 is held in a tensioned state between square shaft 9 and spring biassed shaft 10. The shaft 10 is mounted on a slider 66 having a front lug 67 and a rear lug 68 on each side, the lugs slide in grooves 69 in support rails 70.

Figure 5:
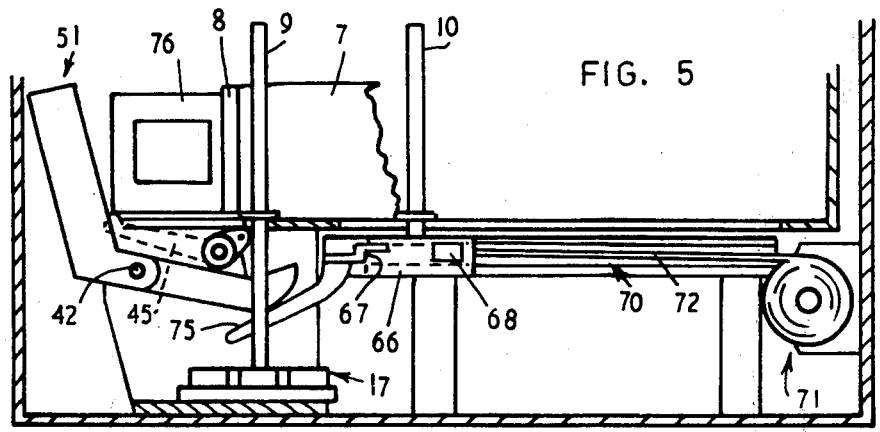
FIG. 5 is view similar to FIG. 4 with the slide in projection position but released from restraint so that indexing of the magazine can be accomplished.

The slider 66 is spring biassed away from mast 9 by a constant tension spring unit 71 which comprises a flexible steel strip 72 fixed at one end to slider 66. The strip 72, which has been previously pre-tensioned around a constant curvature is stored on a spool 73. The natural action of the strip is to wrap itself around the spool on which it is mounted, the spool 73 is rotatably supported in bearings 74 on the projector casing 1. The technical term applied to such springs is "tensator" or "negator". The lug 67 is of Z configuration and the steps in the lugs 67 are engageable with the ends of the rails 70 adjacent the square shaft 9 by application of a slight downward deflection of the slide when the lug steps are beyond the ends of rails 70. In this position an inclined abutment face 75 on the slider 66 engages the curved underface of arm 48 and raises it causing the shafts 42 and 41 to rotate. This results in the arms 45 and 51 taking up the positions shown in FIG. 5 which, as hereinafter described is also the position to which these components moved when a slide is being advanced to projection position.

In this position the endless flexible slide holder is released from its drive and from tension by spring 72 and rapid and easy exchange or removal of flexible slide holders can be achieved. Upon release of the slider 66 e.g. by applying a small degree of upward pressure sufficient to release the lugs from the engagement with the ends of the rails 70 the spring 72 will cause the mast 10 to move away from the square mast 9.

Figure 4:
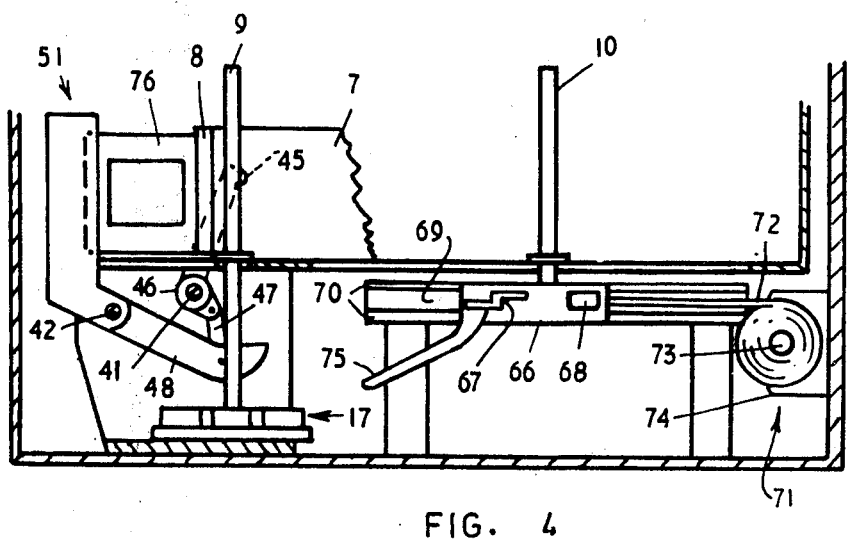
FIG. 4 is fragmentary sectional elevation showing the relationship of some projector components as positioned for the projection of a slide, some components are not shown to assist in the clear understanding of the invention.

A detailed description of the operation of the slide advancing mechanism is as follows. FIG. 4 shows in a general way, partly in section and with various components as previously described removed for simplicity, the situation with a slide in projection position. It will be seen that the slide 76 is at right angles to the axis of the lens system and is in edge engagement with a clip 8 on the belt 7 and the notch 54 in arm 51, it is thus held firmly in position. The first of the following slides, 77, is held out of alignment with the lens system by arm 45.

The removal of slide 76 from projection position is achieved by first energizing the motor drive to gear 34 from a hand held control unit or in some other convenient way. Desirably the control unit incorporates switch means for initiating forward rotation of the motor and this energisation of the motor will continue for a single slide indexing operation due to the interruption of the current supply to the motor by the circuit breaking switch 39 actuated by the cam 35.

Having initiated movement of the electric motor by the hand control unit for either forward or reverse operation, the motor would rotate turning the gear 34 and the shutter cam 38 to release the shutter 60 from control of the cam 38 and permit the spring 62 to move the shutter 60 into its lens obscuring position, the Geneva action would commence to operate by engagement of peg 64 of member 33 with a slotted leg 18 and simultaneously the second shaft 42 would be moved by cam and follower 36–50. Through arm and link 48–47 the shaft 41 would be part rotated and the slide restraining arms 45 and 51 would be lowered to the position shown in FIG. 5. Continued operation of the motor would complete a single Geneva operation and index the square mast 9 through 90°. Further rotation of the gear 34 would result in the arms 45 being raised to secure the slide preceding and succeeding the slide now in projection position in their correct locations. The arm 51 is raised simultaneously to accurately locate the free edge of the slide to be projected in notch 54 and the shutter 60 is moved by its cam 38 in arcuate fashion to a position allowing the image on the slide 76 to be projected onto a screen. As the latter situation is achieved the circuit breaking switch 39 is operated by cam 35 so that the electric motor is de-energised and preferably dynamically braked to ensure correct positioning of the cams 35, 36 and 38. The situation will remain static until such time as the electric motor is again energised by the hand control when the foregoing sequence of events will be repeated either in forward or reverse mode.

The lens system of the projector provides for manual and power focusing of the lens unit 5 and also incorporates a safety device whereby power operation cannot cause damage to the lens focusing means.

Figure 7:
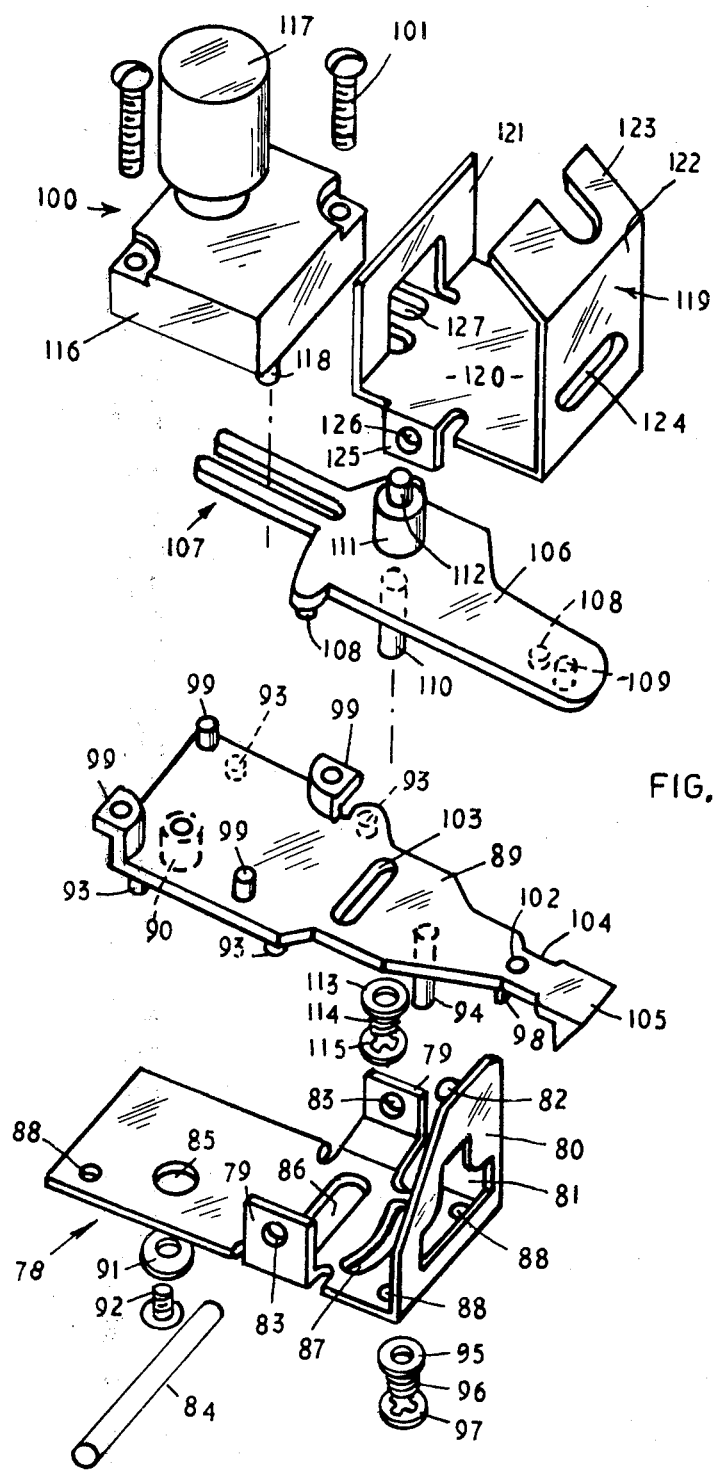
FIG. 7 is an exploded perspective view of the components of the lens unit focusing mechanism.

The lens unit focusing means is shown in detail in FIG. 7. A base plate 78 is provided having upstanding lugs 79 and an upstanding end 80. The end 80 has an opening 81 therein and a peg 82 extending normal over the base plate 78. The lugs 79 have holes 83 therein to support a guide bar 84. The base plate 78 has a first hole 85 there, a straight slot 86 therein and a curved slot 87 therein. Holes 88 in the base plate 78 permit fixing screws to be used to secure the base plate 78 to the casing. Pivotally mounted on the base plate 78 is a first platform 89 having an underboss 90 which enters into the hole 85 to pivotally connect the platform 89 to the base frame and a keeper washer 91 and screw 92 is used to hold the components together. Short under bosses 93 support the platform 89 on the base plate 78.

A rod 94 projecting downwardly from the underface of platform 89 extends through slot 87 and a friction washer 95 spring 96 and clip 97 are mounted thereon. The washer 95 exerts a frictional drag on the underface of plate 78. The platform 89 also has a short underleg 98 which bears on the upper face of the base plate 78.

On the upper face of platform 89 are four bosses 99 two having holes therein, to support a motor gearbox unit 100 held by screws 101 to the bosses 99. There is also a hole 102 in the upper face of platform 89 and a slot 103 therethrough.

The end portion 104 of platform is reduced in width to project through hole 81 in end 80 of the base plate and the portion 104 has a lug 105 on it whereby the platform can be manually pivoted about the 90 to 85 pivotal connection.

Above platform 89 is mounted a second platform 106 having a forked end part 107, underface pads 108, a first underface pin 109 (which engages hole 102) a second underface pin 110 (which passes through slot 103) and an upstanding boss 111 having a central upstanding pivot pin portion 112. A friction washer 113, a spring 114 and a clip 115 are mounted on pin 110 so washer 113 exerts a frictional drag on the undersurface of platform 89. The slot 86 provides clearance for the parts 110, and 113 to 115.

The motor gearbox assembly 100 comprises a gearbox 116 with a motor 117 fixed thereto. The shaft of the motor 117 is coupled through a gear speed reduction, of any suitable type, to pin 118 which travels in a circle (i.e. it is eccentric) as the motor rotates. The pin 118 engages between the legs of the forked end 107 of the upper platform 106. As the motor rotates, the pin to forked end connecton causes the platform 106 to pivot about the pin to hole connection 109–102 with the pads 108 pulled into friction engagement with the upper face of the first platform 89 by the spring assembly 113–115.

Figure 3:
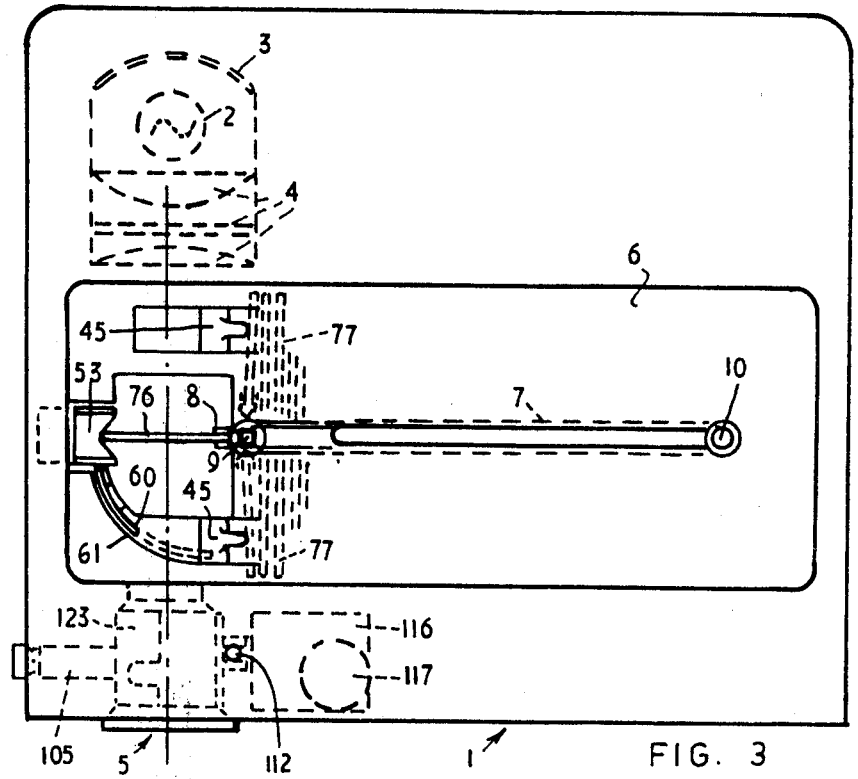
FIG. 3 is plan view of the projector with the lid removed and some components of the projector shown in dotted outline.

Disposed above the upper platform is a generally U shaped lens carrier 119 comprising a bottom 120 two upturned sides 121 and 122. A lens tube 5 (of known type shown in FIG. 3) is clamped between the sides 121 and 122 and below a portion 123 of side 122. The side 119 has a slot 124 therein which is close sliding fit on peg 82. Two downturned legs 125 have holes 126 therein which slide on guide bar 84. A forked leg 127 embraces the pivot pin 112.

The operation of the lens focusing means is as follows, it is to be remembered that an essential aspect of the focusing means is that the lens unit 5 always moves in a straight line on guide bar 84.

In operation manual movement of the lens can be achieved by manual movement of platform 89 through lug 105. Platform 89 is connected to lens carrier 119 through the pin 112 and fork 127 of the lens carrier. Thus arcuate movement of the first platform about its pivot point 90–85 will result in rectilinear motion of the lens unit on the guide bar 84 and sliding of pin 112 in the fork 127. In the event of power operation being required, irrespective of the manual positioning of the assembly, the motor 117 is energised the upper platform moves about its pivot 109–102 and as a result of the pin 112 acting on the sides of fork 127 the lens carrier 122 is again given rectilinear motion along bar 84.

The safety feature aforementioned results out of the pivotal connection between the two platforms. If for example the lens unit 5 has been adjusted to the full manual movement or is approaching the full manual movement and power operation is initiated, the lens carrier will be forced to the end of the guide bar 84 and against the lugs 79 supporting the bar 84 resulting in the pivot pin 112 becoming a fulcrum, the forked end 107 will still move under the influence of pin 118 and the pin 109 acting through hole 102 will urge the lower platform in the opposite direction causing it to pivot about its pivotal connection 90–85. In this way it is impossible for power operation of the lens unit to build up forces or pressures or stresses which will damage the mechanism concerned. The motor 117 is again a reversible motor so that forward and reverse movement of the lens carrier (and therefore the lens unit) can be achieved for correctly focusing the lens unit for the particular slide being projected.

We claim:

1. In a slide projector having a casing, a lens system in the casing defining an optical axis, a drive shaft indexable through ninety degree steps to feed slides one by one into and out of a projection position across said optical axis, first arm means pivotally mounted in said casing on opposite sides of said projection position for rocking movement between extended hold-out positions and retracted positions, and second arm means pivotally mounted in said casing for rocking movement toward and away from said drive shaft into and out of positioning engagement with a slide in the projection position, an improved drive mechanism comprising:

a cam assembly rotatably mounted in said casing;

drive means including a drive gear mounted on said cam assembly and means that are operable when activated to rotate said drive gear through one revolution;

a Geneva drive comprising a driving peg eccentrically mounted on said cam assembly and a Geneva cross wheel engageable with said peg and coupled to said drive shaft to turn the latter through a ninety degree step upon rotation of said peg by said cam assembly;

first cam-and-follower means coupling said cam assembly to one of said arm means for rocking the latter in timed relation with the stepping of said drive shaft;

and means coupling said one arm means to the other arm means for rocking the latter in timed relation with the stepping of the drive shaft.

2. A slide projector as defined in claim 1 in which said first and second arm means are mounted on first and second parallel shafts that are rotatably supported in said casing, said first arm means being fixed to said first shaft, and said second arm means being fixed to said second shaft, and said cam-and-follower means comprising a first cam on said cam assembly and having an axially facing cam face, and a follower arm fixed to said second shaft and extending radially therefrom into engagement with said cam face to be rocked back and forth thereby, and to correspondingly rotate said second shaft.

3. A slide projector as defined in claim 2 in which said means coupling said shafts comprise a linkage for transmitting back-and-forth rotation of said second shaft to said first shaft.

4. A slide projector as defined in claim 2 in which said first cam formed on said drive gear, said cam face being one end surface of the drive gear.

5. A slide projector as defined in claim 1 further including shutter means mounted in said casing for movement across said optical axis between two positions in which said shutter means respectively prevent and permit projection, and second cam-and-follower means for moving said shutter means between such positions, comprising a shutter cam mounted on said cam assembly to rotate therewith, and a shutter follower mounted on said shutter means in the path of said shutter cam, to be moved across said optical axis in timed relation with the stepping of said drive shaft.

6. A slide projector as defined in claim 5 wherein said shutter means are pivotally mounted in said casing for back-and-forth swinging between such positions, and said shutter cam comprises a radially projecting lobe on said cam assembly engageable with said shutter follower to move it into the projection-permitting position as the cam assembly rotates, and then to release said shutter follower, the shutter being spring-biased toward the projection-preventing position to return thereto when the shutter follower is released.

7. A slide projector as defined in claim 1 in which said drive means include an electric motor that is selectively energizable to activate said drive means, and a switch for terminating activation of said motor, said cam assembly having a motor cam thereon with a radially facing cam face thereon, and said switch having a switch arm engageable with said motor cam to control activation of said motor.

8. A slide projector as defined in claim 1 in which said first and second arm means are mounted, respectively, on first and second parallel shafts rotatably supported in said casing and coupled by a linkage for rocking the shafts together;
   said cam-and-follower means comprising a first cam formed on said drive gear and having an axially facing cam face, and a follower arm projecting radially from said second shaft and engageable with said cam face to be rocked back and forth;
   said slide projector also having shutter means mounted in said casing for back-and-forth movement across said optical axis, and including, a part of said drive means, an electric motor that is selectively energizable to activate said drive means, and a switch for terminating activation of said motor;
   and further including second and third cam-and-follower means for operating, respectively, said shutter means and said switch, and each including a cam on said cam assembly and a follower on the operated element engageable with the associated cam to be moved in timed relation with the drive shaft.

9. A slide projector as defined in claim 1 wherein said drive shaft is rotatably mounted in said casing to rotate about a fixed axis, and in which said projector also includes magazine-tensioning means comprising a second shaft substantially parallel to said drive shaft, a slider carrying said second shaft and mounted in said casing for movement toward and away from said drive shaft, and biassing means for urging the slider away from the drive shaft, said biassing means comprising an elongated flexible spring strip pre-tensioned around a constant curvature, and a spool rotatably supported in said casing, said strip being wound upon said spool and connected at one end to said slider.

10. A slide projector as defined in claim 9 wherein said slider is supported on rails in said casing, and has lugs adjacent each of its ends engaged in slots in the rails, a stepped portion on the lugs nearest the drive shaft engageable with the ends of the rails nearest the drive shaft, an abutment face on the slider engageable with said second arm means to move it and the interlinked first arm means to the slide release position where they are maintainable by engagement of the lug stepped portion with the rail ends.

* * * * *

UNITED STATES PATENT AND TRADEMARK OFFICE
CERTIFICATE OF CORRECTION

PATENT NO.  :  3,990,790
DATED       :  November 9, 1976
INVENTOR(S) :  Robert Edward Styles and John C. Les Veaux It is certified that error appears in the above-identified patent and that said Letters Patent are hereby corrected as shown below:

Column 1, line 53, after "projection", insert --position--.

Column 3, line 26, "fron" should be --from--.

Column 4, line 18, after "forward" insert --or reverse--.

Column 5, line 29, "undersurface" should be --underface--.

Column 7, line 2, after "cam" (first occurrence) insert --is--.

Signed and Sealed this

First Day of March 1977

[SEAL]

Attest:

RUTH C. MASON
*Attesting Officer*

C. MARSHALL DANN
*Commissioner of Patents and Trademarks*